United States Patent
Hu et al.

(10) Patent No.: US 10,753,193 B2
(45) Date of Patent: Aug. 25, 2020

(54) HETEROGENEITY PROFILING ANALYSIS FOR VOLUMETRIC VOID SPACE CEMENT EVALUATION

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 470 days.

(21) Appl. No.: 15/746,377

(22) PCT Filed: Aug. 19, 2015

(86) PCT No.: PCT/US2015/045882
§ 371 (c)(1),
(2) Date: Jan. 19, 2018

(87) PCT Pub. No.: WO2017/030578
PCT Pub. Date: Feb. 23, 2017

(65) Prior Publication Data
US 2018/0195378 A1    Jul. 12, 2018

(51) Int. Cl.
*E21B 47/00*    (2012.01)
*E21B 47/005*    (2012.01)
(Continued)

(52) U.S. Cl.
CPC ............ *E21B 47/005* (2020.05); *E21B 47/01* (2013.01); *G01N 29/4472* (2013.01);
(Continued)

(58) Field of Classification Search
CPC .................. E21B 47/005; E21B 47/01; G01N 2291/0232; G01N 2291/0289; G01N 29/4472; G01V 5/045; G01V 5/12
See application file for complete search history.

(56) References Cited

U.S. PATENT DOCUMENTS 3,081,401 A    3/1963   Wilson
3,110,807 A    11/1963   Wilson
(Continued)

FOREIGN PATENT DOCUMENTS

EP     816872 A1    1/1998
EP    2309259 A1    4/2011
(Continued)

OTHER PUBLICATIONS

Xu et al., "An Experimental Study of the Nano-Scratch Behavior of Cement Composite Material," Key Engineering Materials, 2012 vol. 492, pp. 47-54.
(Continued)

*Primary Examiner* — Marcus H Taningco
(74) *Attorney, Agent, or Firm* — John Wustenberg; C. Tumey Law Group PLLC

(57) ABSTRACT

Methods and systems including establishing a wellbore heterogeneity profiling factor (HPF), establishing a cement quality curve representing a volumetric void space of a completion profile, and comparing the wellbore HPF and the cement quality curve, thereby determining a cement volumetric void space in a wellbore at a target depth having the completion profile.

20 Claims, 9 Drawing Sheets

(51) Int. Cl.
  *G01V 5/12* (2006.01)
  *E21B 47/01* (2012.01)
  *G01N 29/44* (2006.01)
  *G01V 5/04* (2006.01)

(52) U.S. Cl.
  CPC ............ *G01V 5/045* (2013.01); *G01V 5/12* (2013.01); *G01N 2291/0232* (2013.01); *G01N 2291/0289* (2013.01)

(56) References Cited

U.S. PATENT DOCUMENTS

| | | | |
|---|---|---|---|
| 5,578,820 A * | 11/1996 | Gadeken | G01V 5/06 250/256 |
| 7,289,916 B2 | 10/2007 | Drnevich et al. | |
| 9,696,454 B1 * | 7/2017 | Gade | G01V 5/102 |
| 2005/0128873 A1 | 6/2005 | LaBry | |
| 2006/0133203 A1 | 6/2006 | James et al. | |
| 2006/0133204 A1 | 6/2006 | Froelich | |
| 2007/0263212 A1 | 11/2007 | Mound | |
| 2008/0116365 A1 | 5/2008 | Flecker | |
| 2010/0126718 A1 | 5/2010 | Lilley | |
| 2012/0033528 A1 | 2/2012 | Zhao et al. | |
| 2012/0075953 A1 * | 3/2012 | Chace | G01V 5/101 367/35 |
| 2012/0158333 A1 | 6/2012 | Li et al. | |
| 2012/0327410 A1 | 12/2012 | Maston | |
| 2014/0052376 A1 | 2/2014 | Guo et al. | |
| 2015/0090871 A1 | 4/2015 | Chace | |
| 2016/0334540 A1 * | 11/2016 | Quintero | G01V 5/08 |
| 2017/0090060 A1 * | 3/2017 | Donderici | G01N 27/02 |
| 2017/0218749 A1 * | 8/2017 | Lee | G21K 1/02 |

FOREIGN PATENT DOCUMENTS

| | | |
|---|---|---|
| WO | WO-2010054387 A2 | 5/2010 |
| WO | WO-2013156843 A1 | 10/2013 |
| WO | WO-2017/030579 A1 | 2/2017 |

OTHER PUBLICATIONS

Yuan et al., "HPHT Gas Well Cementing Complications and its Effect on Casing Collapse Resistance," SPE 153986, 2012, 20 pages.

* cited by examiner

HETEROGENEITY PROFILING ANALYSIS FOR VOLUMETRIC VOID SPACE CEMENT EVALUATION

BACKGROUND

The present disclosure relates to subterranean formation operations and, more particularly, to a heterogeneity profiling analysis for determining volumetric void space in wellbore cement columns.

Subterranean formation operations (e.g., stimulation operations, sand control operations, completion operations, etc.) often involve drilling a wellbore in a subterranean formation with a drilling fluid (and thereafter placing a cement column between the formation and a casing (or liner string) in the wellbore. The cement column is formed by pumping a cement slurry through the bottom of the casing and out through an annulus between the outer casing wall and the formation face of the wellbore, or by directly pumping a cement slurry into the annulus. The cement slurry then cures in the annular space, thereby forming a column of hardened cement that, inter alia, supports and positions the casing in the wellbore and bonds the exterior surface of the casing to the subterranean formation. This process is referred to as "primary cementing."

Among other things, the cement column may keep fresh water reservoirs from becoming contaminated with produced fluids from within the wellbore. As used herein, the term "fluid" refers to liquid phase fluids and gas phase fluids. The cement column may also prevent unstable formations from caving in, thereby reducing the chance of a casing collapse and/or stuck drill pipe. Finally, the cement column forms a solid barrier to prevent fluid loss or contamination of production zones. The degree of success of a subterranean formation operation involving placement of a cement column, therefore, depends, at least in part, upon the successful cementing of the wellbore casing and the cement's ability to maintain zonal isolation of the wellbore.

Failure of zonal isolation, among other things, may result in environmental contamination, which may cause harm to both flora and fauna, including humans. Such failure may further prevent production or reduce the production capability of a wellbore, which may result in abandonment. These issues may become exacerbated over time, where an understanding of the state of the cement column at an earlier point in time may allow remedial actions to be performed and abandonment avoided.

BRIEF DESCRIPTION OF THE DRAWINGS

The following figure is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
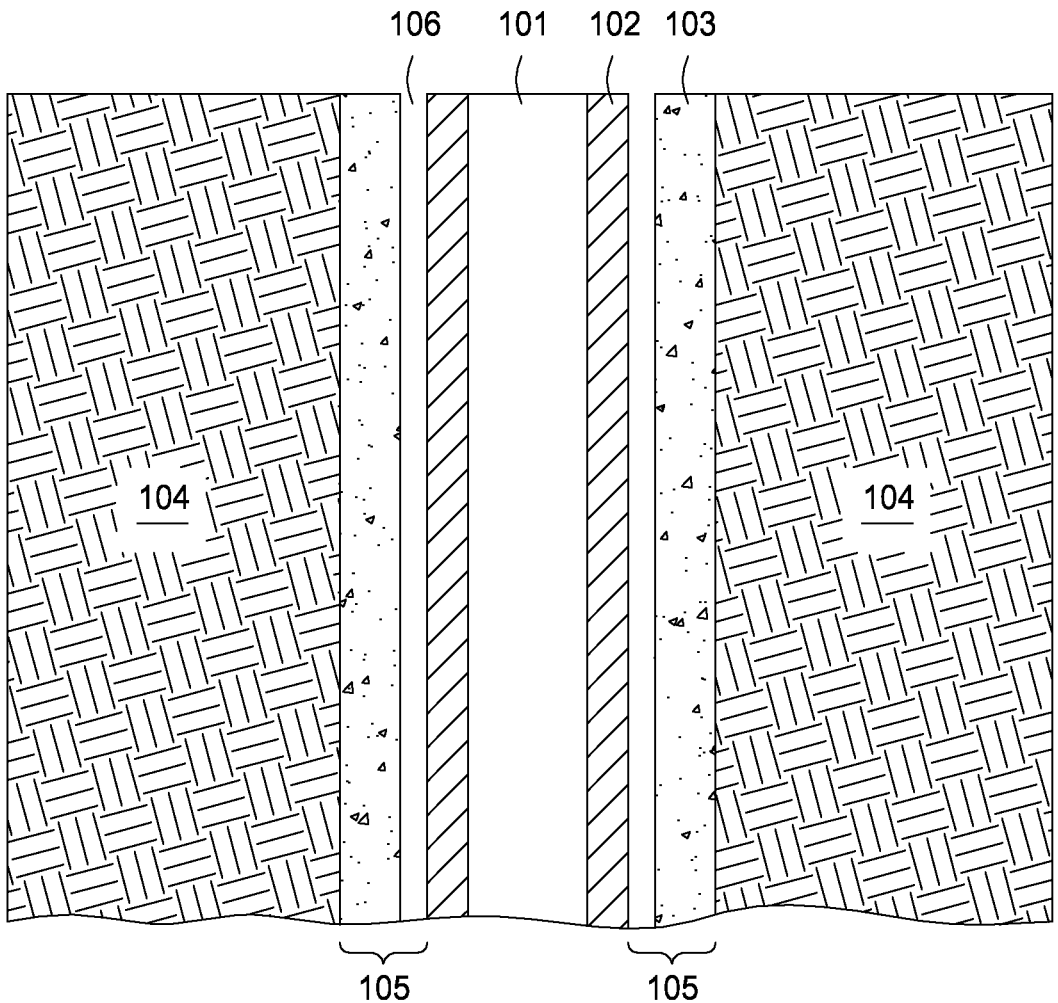
FIG. 1 is a cross-sectional diagram of a cased wellbore in a subterranean formation, according to one or more embodiments of the present disclosure.

The present disclosure relates to subterranean formation operations and, more particularly, to a heterogeneity profiling analysis for determining volumetric void space in wellbore cement columns. Specifically, the embodiments of the present disclosure relate determining a heterogeneity profiling factor ("HPF") for a particular wellbore having a cement column therein. As used herein, the term "heterogeneity profiling factor" or "HPF," and grammatical variants thereof, refers to a comparison between two gamma spectra (e.g., depicting a shape change therebetween or establishing a correlation coefficient therebetween).

The term "wellbore heterogeneity profiling factor" or "wellbore HPF," and grammatical variants thereof, refers to a comparison between a gamma spectrum of a cement column within a wellbore and a standard gamma spectrum, wherein the standard gamma spectrum is taken from a free-pipe and/or well-bonded standard having the same completion profile as the wellbore. As used herein, the term "free-pipe" refers to a cement column having no cement (0%) therein and the term "well-bonded" refers to a cement column having cement therein that fully fills the annulus, as described above. The term "completion profile," as used herein, refers to the size and shape of the wellbore, pipe (i.e., pipe forming the annulus between itself and the wellbore wall, such as casing string), and annulus, regardless of whether the wellbore is actual or simulated (e.g., via electronic means or laboratory means). The wellbore HPF, whether using the free-pipe or well-bonded standard, or both, can then be compared a cement quality curve representing a volumetric void space of the completion profile. Accordingly, the volumetric void space in the cement column in the wellbore can be determined. Such volumetric void space can be established at one or more target depths within the wellbore. As used herein, the term "target depth" or simply "depth" with reference to a wellbore refers to the length of the wellbore, not necessarily a vertical depth from a surface location, as wellbores for use in the embodiments herein may be vertical, horizontal, deviated (i.e., neither vertical nor horizontal), or combinations thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list, and does not exclude the precise number provided. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, numerical properties such as percentages, and so forth used in the present specification and associated claims are to be understood as being modified in all instances by the term "about." As used herein, the term "about" encompasses +/−5% of a numerical value. For example, if the numerical value is 80, the term "about" encompasses the range of 76 to 84. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

The embodiments of the present disclosure include establishing a wellbore HPF comprising taking a gamma spectrum from a cement column in a wellbore having a particular completion profile and at a target depth, obtaining a gamma spectrum from a standard for the same completion profile, and obtaining a correlation coefficient between the wellbore gamma spectrum and the standard gamma spectrum at the target depth. A cement quality curve is also established, wherein the cement quality curve represents a volumetric void space of the completion profile, which may be based on an actual reference wellbore, an electrically simulated wellbore, or a physically simulated wellbore (e.g., a laboratory built wellbore model having the completion profile), as discussed in greater detail below. The wellbore HPF is then compared to the cement quality curve to determine where on the cement quality curve the wellbore HPF falls, thereby permitting a determination of the cement volumetric void space in the wellbore cement column at the target depth.

The wellbore gamma spectrum may be obtained using a downhole logging tool coupled to a conveyance extending into the wellbore. The downhole logging tool (which may also be referred to herein simply as a "logging tool") comprises a gamma source and a detector for obtaining a gamma spectrum of the wellbore at the target depth. A control system comprising a non-transitory medium readable for storing instructions for execution by a processor is coupled to the detector, and is capable of digitizing the wellbore gamma spectrum, obtaining the correlation coefficient between it and one or more digitized standard gamma spectrum, thereby establishing the wellbore HPF, comparing the wellbore HPF to a digitized cement quality curve, and determining the volume of an unknown volumetric void space of cement disposed in the annulus of the wellbore at the target depth.

Referring now to FIG. 1, illustrated is a cross-sectional diagram of a cased wellbore 101 in a subterranean formation 104, according to one or more embodiments of the present disclosure. The wellbore 101 is lined with pipe or casing string 102 that may be formed from a hardened metal (e.g., steel) or plastic, for example. An annulus 105 is formed between the exterior of the pipe 102 and the formation wall 104 (i.e., the wall of the wellbore). Cement 103 is introduced into the wellbore 101 through the interior of the pipe 102 such that upon reaching the bottom or the wellbore 101, it returns upward through the annulus 105 to cure and form a cement column. After curing, one or more volumetric void spaces, such as gap 106 may be located at a particular depth and relative location within the width of the cement column, thereby resulting in an area that is devoid of cement.

For example, the gap 106 may be formed due to imperfections introduced into the cement 103 during construction and/or due to subsequent wear damages caused by the use of the wellbore 101 (e.g., during hydrocarbon production). Using a downhole logging tool having a gamma source and a detector for obtaining a gamma spectrum of a wellbore at a target depth, in combination with the embodiments described herein of establishing a wellbore HPF and comparing it to a quality curve representing volumetric void spaces having the same completion profile as the wellbore, a volumetric void space of the amount of gap 106 can be determined.

Figure 2:
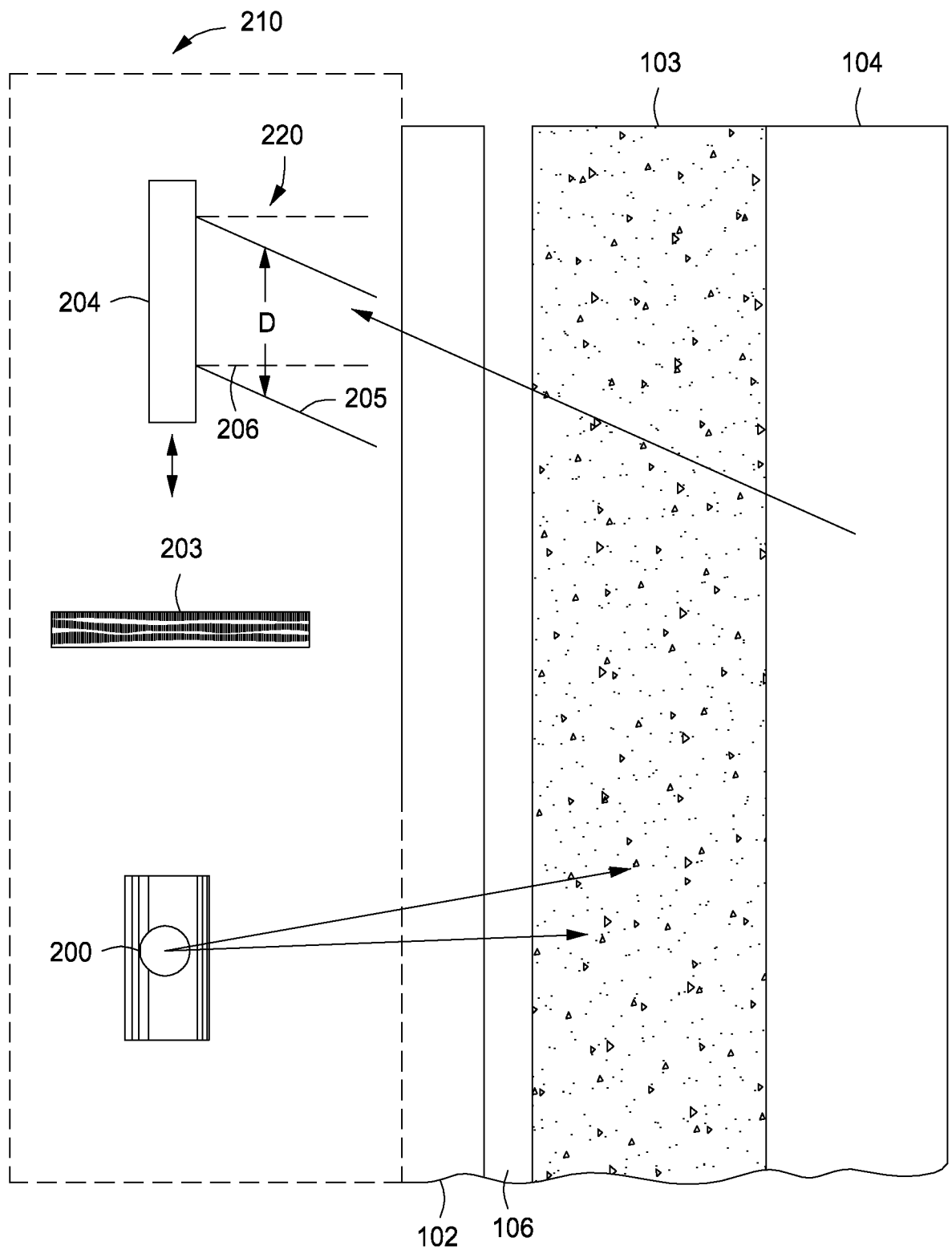
FIG. 2 is a block diagram of a downhole logging tool for performing one or more operation, according to one or more embodiments of the present disclosure.

Referring now to FIG. 2, illustrated is a block diagram showing a downhole logging tool 210, according to one or more embodiments of the present disclosure. The downhole logging tool 210 comprises a gamma source 200 for emitting gamma radiation, which penetrates the casing string 102, cement 103, and formation 104 and reflects back to the detector 204 to generate a gamma spectra associated with the cement 103 and possible gaps 106 inside or adjacent the cement 103 behind the casing string 102 and in the annulus 105 (FIG. 1). The downhole logging tool may be located in a drill string tool housing to be used during a logging while drilling (LWD) or measurement while drilling (MWD) operation, or may be located in a wireline tool housing to be used during a wireline logging operation, or conveyed housed in any other downhole tool or by itself to a target location within wellbore 101 (FIG. 1), without departing from the scope of the present disclosure.

The gamma source 200 generates monochromatic high energy photon gamma radiation (i.e., gamma rays). The gamma source 200 may, for example, be a caesium-137 gamma radiation source. Photons from the gamma source 200 interact with the annulus 105 and any cement 103 or gaps 106 therein and back through the casing string 102 to the detector 204. The detector 204 thus detects the scattered photons from the gamma source 200 after the photons interact with the contents of the annulus 105.

A radiation shield 203 is located between the gamma source 200 and the detector 204. The radiation shield 203 blocks photons from traveling directly from the gamma source 200 to the detector 204 without passing through the annulus 105. The radiation shield 203 may be any photon blocking material (e.g., tungsten, lead, and the like) appropriate for blocking high energy photons from the gamma source 200. The front of the detector 204 may additionally be shielded with any material capable of acting as a photon blocking material (e.g., those used to form the radiation shield 203), such as a metal having a relatively high atomic number (e.g., tungsten) to block photons coming from scattering other than the annulus 105 and contents therein (or lack of contents). A detector collimator 220 (shown in phantom) may be cut into the detector 204 shielding to allow the photons scattered behind the casing string 102 to pass through. The size (e.g., diameter) "D" of the detector collimator 220, its relative position to a detector crystal and its angle (if any) relative to the gamma source 200 may determine the amount of gamma rays (i.e., photons) detected by the detector 204. The amount of photons may be represented by a graphical depiction of detection rate (i.e., counts per second, such as per 5 seconds).

In one embodiment, a detector collimator 205 may be angled more toward the gamma source 200 than toward the formation 104. In another embodiment, a detector collimator 206 may be angled more toward the formation 104 than toward the gamma source 200. The detector collimator 220 may also have various sizes D in order to detect desired energy spectra, without departing from the scope of the present disclosure. In order to provide a more desirable energy range within which the detected energy spectra is independent of the formation 104, the energy range may be increased in response to the detector collimator (e.g., 205 or 206) being angled more toward the gamma source 200. In another example, the energy range may be increased in response to decreasing the diameter D of the detector collimator.

Figure 4:
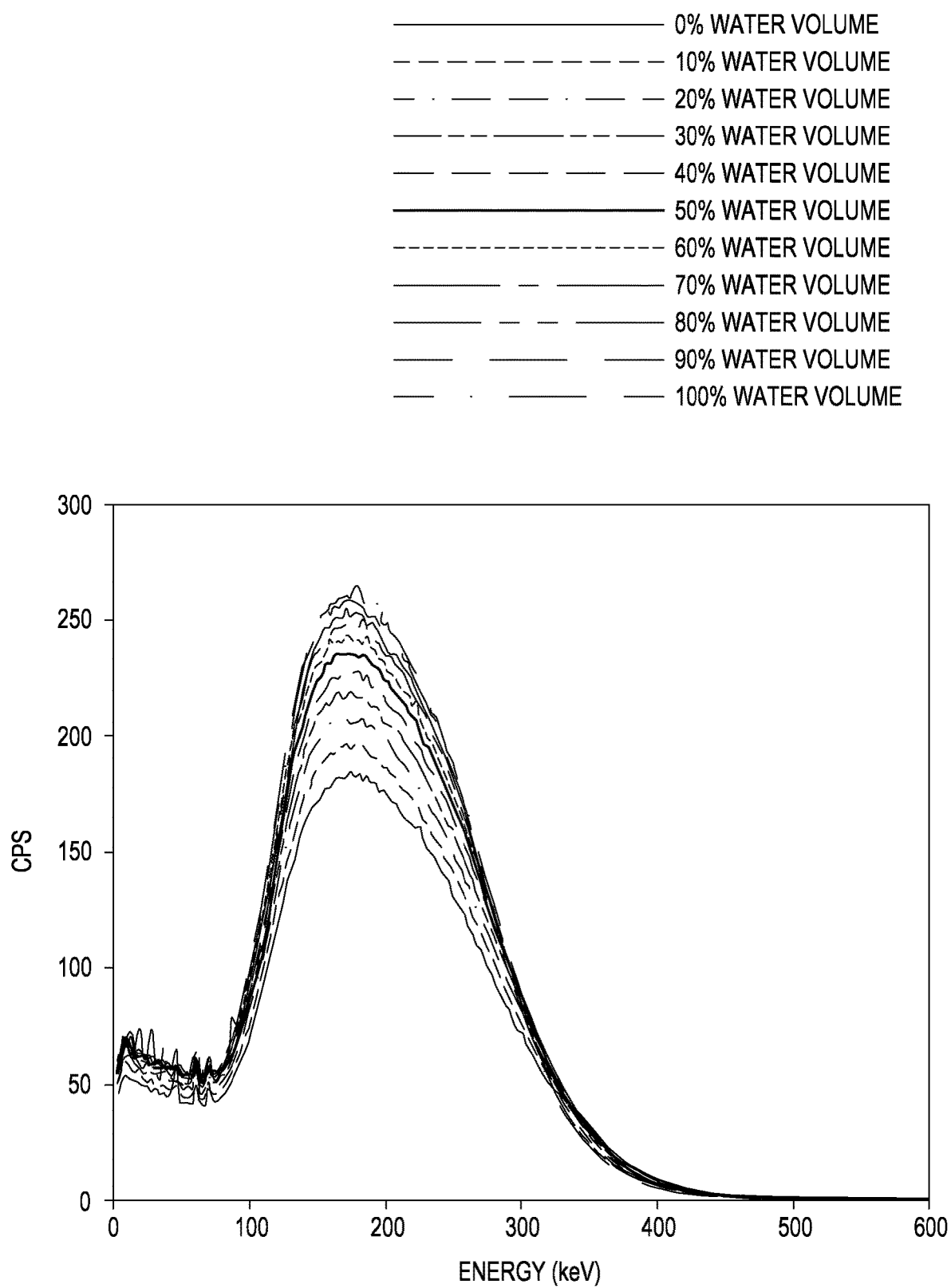
FIG. 4 is a graph showing detected gamma energy spectra for use in forming a cement quality curve, according to one or more embodiments of the present disclosure.
Figure 5:
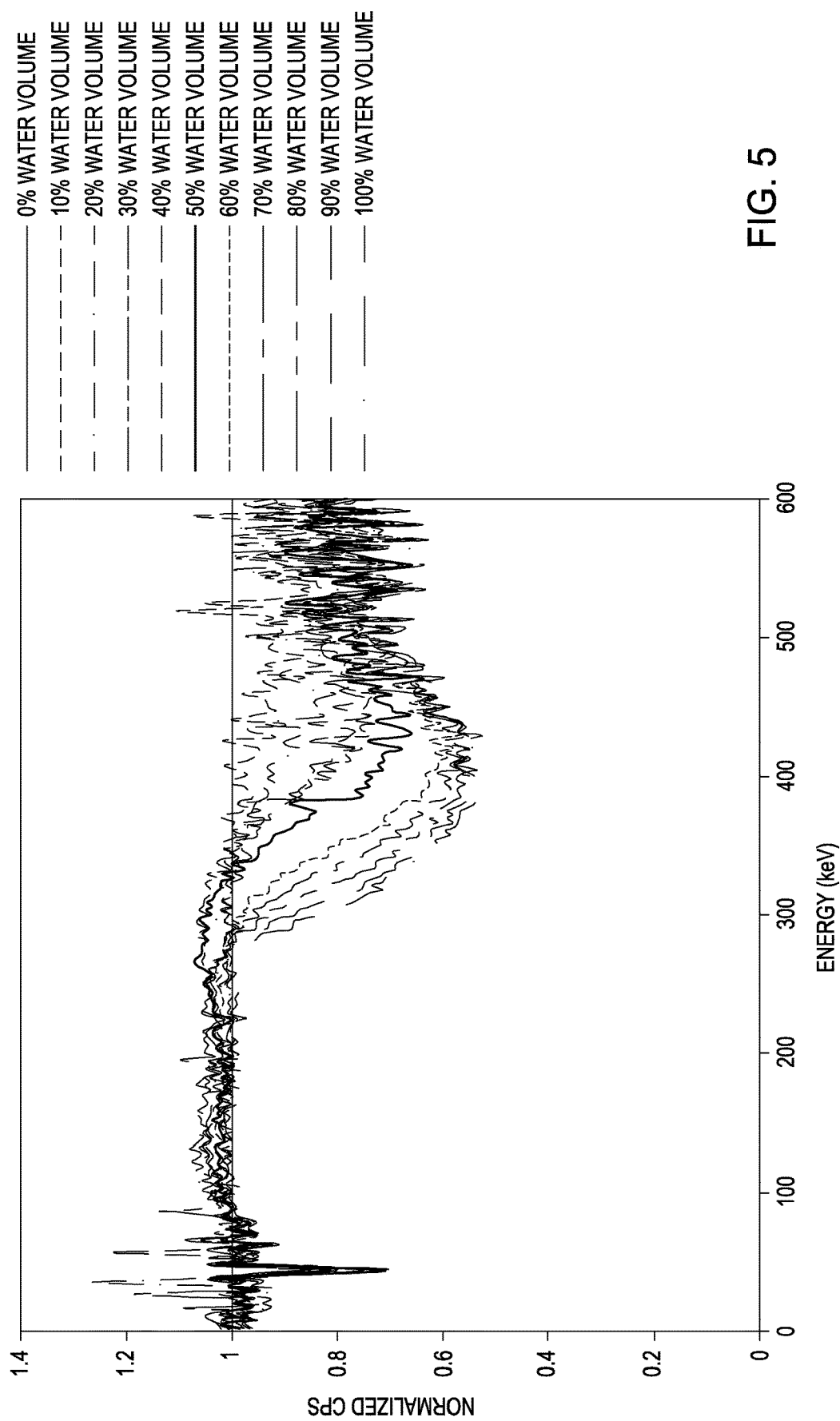
FIG. 5 is a graph showing normalized detected gamma energy spectra for use in forming a cement quality curve, according to one or more embodiments of the present disclosure.

The energy range for any particular gamma source 200 for use in the embodiments described herein is determined based on the nature of the gamma source 200 itself. For example, the energy range shown in FIGS. 4 and 5 is from 0 keV to 600 keV, although other ranges are contemplated, without departing from the scope of the present disclosure and which depend on the particular gamma source 200. A particular energy range within the full gamma spectrum of the gamma source 200 may be selected according to the embodiments herein for evaluation or manipulation to determine information about cement quality, such as to compute one or more HPF values. That is, a more narrow range is selected for processing the scattered photons received by the detector 204, or the detector may be designed to receive a more narrow range. This energy range for processing the data described herein will be referred to as "the energy range for processing" or the "processing energy range," and grammatical variants thereof. For example, in some embodiments, the energy range for processing may be in the range of from about 250 kiloelectron volts (keV) to about 500 keV, encompassing any value and subset therebetween. For example, the energy range for processing may be of from about 250 keV to about 300 keV, or about 300 keV to about 350 keV, or about 350 keV to about 400 keV, or about 400 keV to about 450 keV, or about 450 keV to about 500 keV, encompassing any value and subset therebetween. Each of these values is critical to the embodiments of the present disclosure and may depend on a number of factors including, but not limited to, the configuration of the logging tool 210 (e.g., the angle of the detector collimator), the energy spectra used to establish the cement quality curve, the energy spectra used to establish the standard gamma spectrum, and the like, and any combination thereof. Accordingly, the HPF described herein may be computed based on a gamma spectrum within this range as described in more detail below.

As defined herein, a detector collimator 205 that is "angled more toward the formation" has an angle of approximately 90° with reference to the longitudinal axis of the logging tool 210. As used herein, a detector collimator 205 that is "angled more towards the gamma source" has an input having an angle of less than, or substantially less than, 90° with reference to the longitudinal axis of the logging tool 210. The distance between the detector 204 and the gamma source 200 may be adjusted, in addition to adjusting the collimator angle and/or the collimator diameter D, to detect and evaluate gamma ray energy spectra within a processing energy range, (e.g., between about 250 keV and 500 keV).

The energy spectra received by the detector 204 are independent of the formation 104 properties (e.g., porosity, density, permeability, and the like). Accordingly, the received energy spectra are substantially similar (e.g., amplitude and shape) even as the formation 104 properties change (e.g., porosity, and the like), and may depend on other factors including, but not limited to, various tool design parameters (e.g., detector-to-source distance, collimator angle, collimator diameter, and the like). In some embodiments, during a logging operation, the logging tool 210 may be placed against the casing string 102 in the wellbore 101 in order to reduce or eliminate any space between the logging tool 210 and the casing string 102 that may alter spectral measurements.

Photons entering the annulus 105 from the gamma source 200 may be reflected back through interaction with contents of the annulus 105 (i.e., cement 103 and/or gaps 106) a single depth, or at a plurality of depths. Additionally, the logging tool 210 may interact with the wellbore 101 at a single location or at multiple locations, such as by rotating the logging tool 210 in the azimuthal direction in the wellbore 101 at a single depth so that an entire diameter of the annulus 105 is investigated.

Accordingly, as described above, the design parameters for the logging tool 210 include detector-to-source spacing, detector collimator size, and detector collimator angle. The optimal logging tool 210 design parameters increase spectrum count rates, increase spectrum sensitivity to cement 103 quality, and decrease the spectrum sensitivity to formation 104 properties.

Figure 3C:
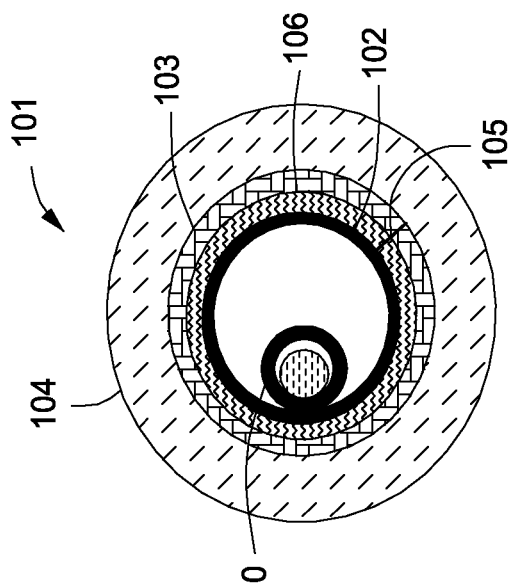
FIGS. 3A-3C are diagrams showing various wellbore configurations for use in determining the wellbore heterogeneity profiling factor, according to one or more embodiments of the present disclosure.
Figure 3B:
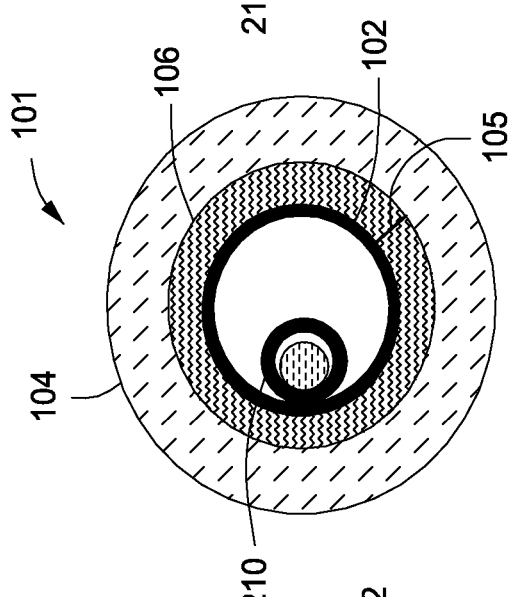
Figure 3A:
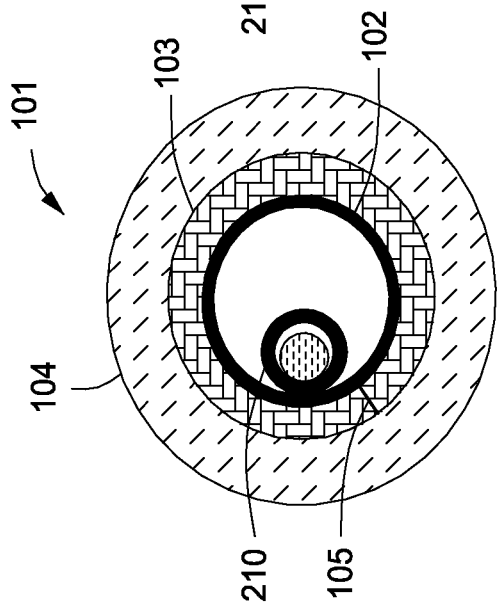

Referring now to FIGS. 3A-3C, with continued reference to FIGS. 1 and 2, illustrated is a logging tool 210 for use in establishing a wellbore gamma spectrum for determining a wellbore HPF, where the annulus may have full cement, no cement, or cement with gaps therein. Referring now to FIG. 3A, wellbore 101 comprises subterranean formation 104, casing string 102, and annulus 105. Within the annulus 105 is cement 103, which has no gaps, or no detectable gaps, therein. Accordingly, the wellbore 101 is referred to as "well-bonded," as cement 103 fully fills the annulus 105 between the casing string 102 and the formation 104. Downhole logging tool 210 is shown abutted to the casing string 102 for emitting gamma rays and receiving an energy spectrum therefrom associated with the volumetric space of the cement 103, which in FIG. 3A does not comprise any, or any detectable, void space therein. FIG. 3B, on the other hand, shows a wellbore 101 comprising subterranean formation 104, casing string 102, and annulus 105. The annulus 105 comprises gap 106 and no cement. Such a wellbore 101 is referred to as "free-pipe," as the annulus 105 has no cement therein. The annulus 105 may be filled with some other substance, including a gas (e.g., air) or a fluid (e.g., water).

In many wellbores, the annulus, however, is neither well-bonded nor free-pipe, but instead comprises both gaps and cement, as shown in FIG. 3C. FIG. 3C depicts a wellbore 101 comprising subterranean formation 104, casing string 102, and annulus 105. Within the annulus 105 is both cement 103 and gap 106. As depicted, the gap 106 abuts the casing string 102 and is continuous about the diameter of the annulus 105. It will be appreciated, however, that the gap 106 may be discontinuous (i.e., a plurality of gaps) that may be positioned at any location in the annulus 105 (e.g., closer to the formation 104), without departing from the scope of the present disclosure. Accordingly, locating the logging tool 210 at a depth in the wellbore 101 and obtaining energy spectra from the entire diameter about the casing string 102 representing the annulus therein may be preferred.

Accordingly, the wellbore gamma spectrum for use in determining the wellbore HPF of the present disclosure may be taken at a target depth in a wellbore being examined for cement volumetric void space (an "examined wellbore") having a particular completion profile, as described above. A gamma spectrum from a standard (a "standard gamma spectrum") having the same completion profile is also obtained. The standard gamma spectrum is obtained from a free-pipe or well-bonded actual or simulated wellbore having an identical completion profile as that of the examined wellbore. That is, the standard wellbore may be simulated using a computer having a non-transitory medium and a processor, such as by Monte Carlo simulation, which uses computational algorithms to obtain a model of the standard wellbore. In other embodiments, the standard wellbore may be physically simulated, where a physical model of the standard wellbore is created in a laboratory setting. In yet other embodiments, a section of the examined wellbore or another actual wellbore having the completion profile of the examined wellbore may be used where it is known that it is a free-pipe actual wellbore or a well-bonded actual wellbore, such as by logging experiments performed on the actual wellbore. Thus, the standard gamma spectrum may be obtained from a free-pipe standard or a well-bonded standard based on an electronically simulated wellbore, a physically simulated wellbore, or an actual reference wellbore having the same completion profile as the examined wellbore or a section of the examined wellbore, according to the embodiments described herein. Various standard gamma spectra may be gathered and recorded manually or electronically stored in a database-like medium for retrieval and use based on completion profiles for use in obtaining the wellbore HPF. That is, in some embodiments, the standard gamma spectrum may be based on prior physical or simulated wellbores such that another standard gamma spectrum need not be obtained.

The wellbore and standard gamma spectra used to calculate the HPF described herein may be obtained within an identically defined energy range, which may be the processing energy range (i.e., narrowed from a full energy range) described above of from about 250 keV to about 500 keV, encompassing any value and subset therebetween. That is, the processing energy range used to analyze the wellbore and standard gamma spectra are the same, allowing further analysis of the two spectra, as described in greater detail below.

The wellbore HPF is finally computed by obtaining a correlation coefficient between wellbore gamma spectrum at the target depth and the standard gamma spectrum. As used herein, the term "correlation coefficient" means a statistical measure of the degree to which changes to the value of one variable predict change to the value of another. The method of determining the correlation coefficient between the wellbore gamma spectrum and the standard gamma spectrum is not limiting to any particular method, but rather any method of obtaining a correlation coefficient between the wellbore and standard gamma spectra can be used in accordance with the methods of the present disclosure. For example, the correlation coefficient may be obtained based on the total detected photon count rates, the energy spectra shape, and/or the energy spectra amplitude of the wellbore and standard gamma spectra.

The value of the correlation coefficient is the HPF for the examined wellbore at the target depth. As previously stated, a plurality of target depths may be evaluated throughout a length of a wellbore, without departing from the scope of the present disclosure. Indeed, in doing so, an operator may determine the quality (e.g., integrity) of the cement column throughout the entire length of the examined wellbore, which may prompt corrective actions (e.g., a cement squeeze operation) or warrant abandonment of the wellbore to avoid environmental or human hazards.

As a specific example, the wellbore HPF may be obtained based on two standard gamma spectra, which is also depicted in FIGS. 4 and 5 with reference to the cement quality curve below. A free-pipe standard gamma spectrum and a well-bonded gamma spectrum are obtained having the completion profile of the examined wellbore of interest. Thereafter, the correlation coefficient is obtained by normalizing the wellbore gamma spectrum and the two standard spectra. As used herein, the term "normalized," and grammatical variants thereof (e.g., "normalizing," "normalization," and the like), refers to mathematical multiplication of a gamma spectrum (e.g., based on a detected photon count rate, an energy spectra shape, or an energy spectra amplitude) by a factor that makes a selected value thereof an integral equal to a desired value. The desired value for normalization may be 1, for example. The spectra may be normalized to have the same total count rates across the entire detected (or processing) energy range for any one of the wellbore gamma spectrum, the free pipe standard gamma spectrum, or the well-bonded standard gamma spectrum. The normalized spectra are then divided by the normalized free-pipe gamma spectrum. Thereafter, the correlation coefficient is determined using the $$\frac{\sum(x-\bar{x})(y-\bar{y})}{\sqrt{\sum(x-\bar{x})^2\sum(y-\bar{y})^2}}, \quad \text{Formula I}$$

where x represents the normalized wellbore gamma spectrum and y represents the normalized well-bonded standard gamma spectrum. Alternatively, after normalizing the wellbore gamma spectrum, the free-pipe gamma spectrum, and the well-bonded gamma spectrum, the normalized spectra are divided by the normalized well-bonded gamma spectrum and the correlation coefficient is determined using Formula I, where x represents the normalized wellbore gamma spectrum and y represents the normalized free-pipe standard gamma spectrum.

Once the wellbore HPF for the wellbore is obtained, it is compared to a cement quality curve. As used herein, the term "cement quality curve" refers to a collection of HPF values having known cement volumetric void amounts and a known completion profile. The cement quality curve is established using an electronically simulated wellbore or a physically simulated wellbore having the same completion profile as the examined wellbore; that is, having the same completion profile as the actual wellbore an operator is seeking to determine the cement volumetric void space therein. The electronically or physically simulated wellbore for use in forming the cement quality curve may be by any means discussed above with reference to obtaining the standard cement quality curve (e.g., by electronic modeling such as Monte Carlo simulation, physical modeling in a laboratory setting, and the like). The chosen gamma spectra are selected within a defined processing energy range, such as the same range as the wellbore gamma spectrum and the standard gamma spectrum discussed above, and an HPF is obtained by obtaining a correlation coefficient between the gamma spectra with known cement volumetric void space and either a cement-only (or well-bonded) standard and a no-cement (or free-pipe) standard.

For example, the cement quality curve may be obtained by creating a plurality of electronic or physically simulated wellbores having the completion profile of the examined wellbore. Each of the simulated wellbores as an annulus having a known thickness. As used herein, the term "thickness" with reference to a completion profile refers to the annular distance between a casing string and a formation surface. In establishing the cement quality curve, the simulated wellbores are characterized at least by the thickness (t) of the annulus and a void resolution thickness percentage (p %). As used herein, the term "void resolution thickness percentage" refers to a known percentage of volumetric void space within an annulus of a simulated wellbore. For example, a physically simulated wellbore may be modeled in a laboratory setting, having a completion profile and an annulus of a known thickness. The annulus may be packed 50% with cement against the simulated formation, and 50% with a different material against the simulated casing string, such as air, water, mud, or another gas or fluid, similar to FIG. 3C. In such an example, the void resolution thickness percentage (p %) would equal 50%. As another example, the annulus may be packed 80% with cement against the simulated formation and 20% with a different material against the simulated casing string, where p %=20%. Equally applicable would be any simulated wellbores created electronically.

One of the simulated wellbores represents a cement-only thickness, where (t) has 100% cement; the cement-only thickness simulated wellbore may also be referred to as well-bonded, as described above. Another of the simulated wellbores represents a no-cement thickness, where (t) has 0% cement; the no-cement thickness simulated wellbore may also be referred to as free-pipe, as described above. One or more cement-void thickness simulated wellbores are then created to represent at least one known p %. The one or more cement-void thickness simulated wellbores may be established using Formula II: (t)*(n)(p %), where n represents an integer between 1 and 1/(p %)−1. For example, a plurality of cement-void thickness simulated wellbores may be created where p % is in 1% increments, or 5% increments, or 10% increments, or 20% increments, or 30% increments, or 40% increments, or 50% increments, encompassing any value or subset therebetween. Smaller increments may additionally be used, without departing from the scope of the present disclosure. Moreover, the one or more cement-void thickness simulated wellbores need not be in even increments. For example, two cement-void thickness simulated wellbores may be prepared (e.g., where p %=30% and 80%, or where p %=40% and 60%, and the like). The remaining p % values can be extrapolated therefrom and based on the no-cement and cement-only thickness simulated models.

With continued reference to FIGS. 3A-3C, illustrated are wellbores having downhole tool 210 therein for determining cement volumetric void thickness. These wellbores also illustrate simulated wellbores that can be used to form the cement quality curve described herein. For example, FIG. 3A illustrates a cement-only thickness simulated wellbore, FIG. 3B illustrates a no-cement thickness simulated wellbore, and FIG. 3C illustrates a cement-void thickness simulated wellbore. As previously mentioned, the volumetric void space within the annulus 105 of the cement-void thickness simulated wellbore may be at any location throughout the annular thickness of the annulus 105, including in multiple discontinuous locations or a single continuous void space, without departing from the scope of the present disclosure.

Upon establishing the cement-only thickness simulated wellbore, the no-cement thickness simulated wellbore, and the at least one cement-void thickness simulated wellbore, a gamma spectrum is obtained for each simulated wellbore. Referring now to FIG. 4, illustrated is a graph depicting a series of gamma energy spectra obtained for use in forming the cement quality curve described herein. The simulated wellbores used to establish the gamma spectra in FIG. 4 used water to simulate void space within an annulus having a particular completion profile. Accordingly, the 0% water volume spectra represents the cement-only thickness simulated wellbore and the 100% water volume spectra represents the no-cement thickness simulated wellbore. Therebetween are nine spectra representing 10% void space increments from cement-void thickness simulated wellbores. The defined energy range, in which the simulated wellbores are evaluated, as shown, is in the range of 0 keV to 600 keV. Accordingly, the defined energy range for forming the cement quality curve may be in the range of about 0 keV to about 600 keV, encompassing any value and subset therebetween. In some embodiments, for example, the range may be a processing energy range (i.e., a more narrow energy range compared to the full energy range a gamma source can emit) of from about 250 keV to about 500 keV, encompassing any value and subset therebetween. As can be seen in FIG. 4, the photon counts per second (CPS) along the y-axis increases with increasing volumetric void space (i.e., decreased volume of cement) within the annulus of the simulated wellbores.

A correlation coefficient is obtained between the at least one cement-void thickness gamma spectrum and the cement-only thickness gamma spectrum, or between the at least one cement-void thickness gamma spectrum and the no-cement thickness gamma spectrum. As used herein, the term "thickness gamma spectra" collectively refers to the at least one cement-void thickness gamma spectrum, the cement-only thickness gamma spectrum, and the no-cement thickness gamma spectrum. Any method of determining the correlation coefficient discussed above with reference to establishing the wellbore HPF of an examined wellbore may be used to establish the cement quality curve, without departing from the scope of the present disclosure. The correlation coefficient(s) thus establishes various quality curve HPF values.

As a specific example, similar to that described with reference to establishing the wellbore HPF, the correlation coefficient for use in forming the cement quality curve may be determined using Formula I. For example, the thickness gamma spectra may be normalized to have the same count rates in the entire energy range for the one or more cement void gamma spectrum, the no-cement thickness gamma spectrum, or the cement-only thickness gamma spectrum, without departing from the scope of the present disclosure.

The at least one normalized cement-void thickness gamma spectrum and the normalized no-cement thickness gamma spectrum is then divided by the normalized cement-only thickness gamma spectrum, as illustrated in FIG. 5. Thereafter, the correlation coefficient is determined using the $$\frac{\sum (x - \bar{x})(y - \bar{y})}{\sqrt{\sum (x - \bar{x})^2 \sum (y - \bar{y})^2}},$$ Formula I where x represents the normalized at least one cement-void thickness gamma spectrum and y represents the normalized no-cement thickness standard gamma spectrum. Alternatively, after normalizing the thickness gamma spectra, the at least one normalized cement-void thickness gamma spectrum and the normalized cement-only thickness gamma spectrum are then divided by the normalized no-cement thickness gamma spectrum, and the correlation coefficient is determined using Formula I, where x represents the normalized cement-void thickness gamma spectrum and y represents the normalized cement-only thickness gamma spectrum.

Figure 6:
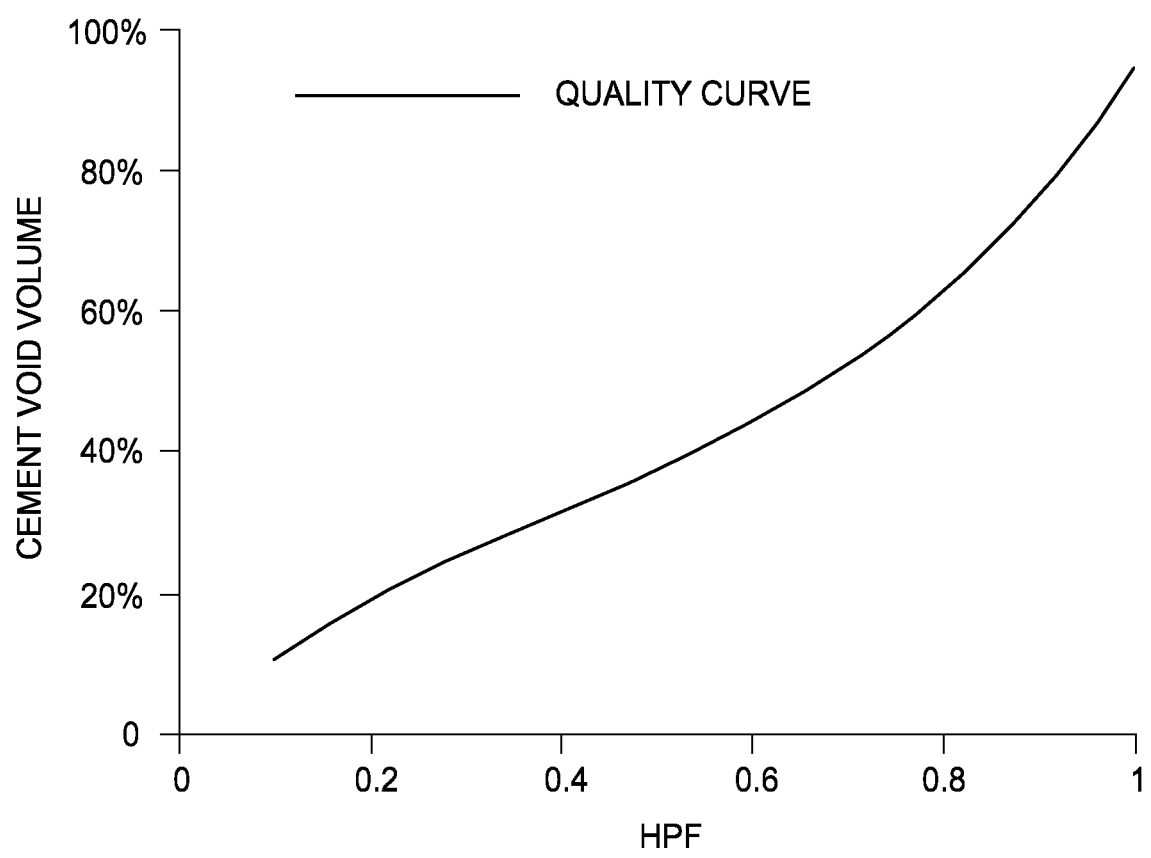
FIG. 6 is a graph of a cement quality curve, according to one or more embodiments of the present disclosure.

Referring now to FIG. 6, illustrated is a cement quality curve for determining the volumetric void space of a cement column in an annulus in the examined wellbore(s). The cement quality curve was established using the HPF values computed from FIGS. 4 and 5. One or more wellbore HPFs (not shown) may be compared to the cement quality curve, each at one or more depths or circumferential locations within a single wellbore, for example, thereby linking wellbore HPF value(s) to a particular cement volumetric void space using a particular completion profile. Accordingly, wellbore HPFs having an unknown cement volumetric void space at a particular location or depth within an examined wellbore may be plotted against the cement quality curve to determine the percentage of cement volumetric void space in the examined wellbore at that location or depth.

Additionally, multiple quality curves can be established based on different wellbore completion profiles. After obtaining the wellbore gamma spectrum and the standard gamma spectrum to determine a correlation coefficient between the two spectra, as described above, to establish the HPF, advanced mathematical analysis methods, such as wavelet analysis, neural network training, basis functions, and the like, may be applied to evaluate cement volumetric void space within an examined wellbore.

Figure 7:
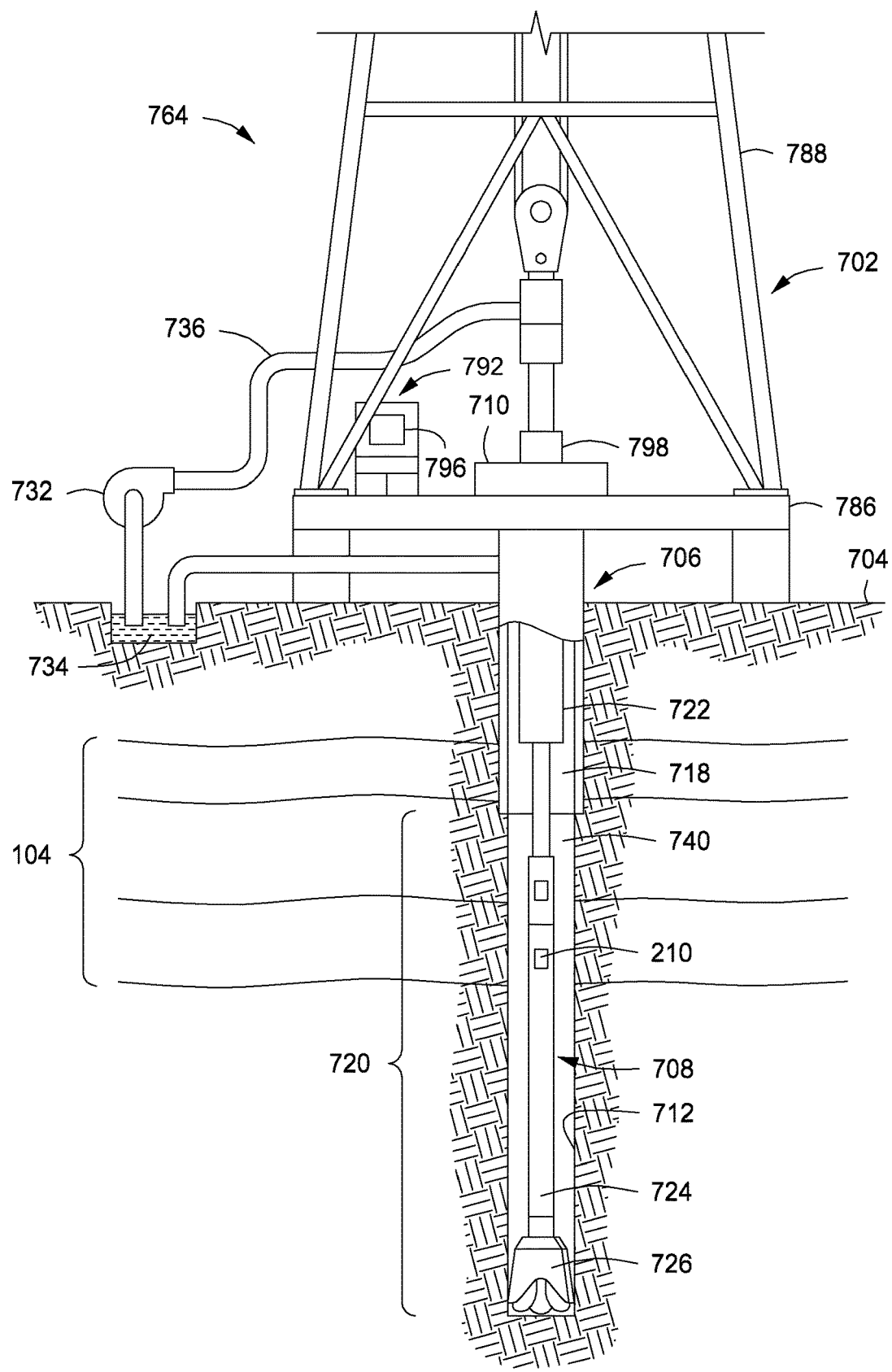
FIG. 7 is a diagram showing a drilling system, according to one or more embodiments of the present disclosure.

FIG. 7 is a diagram showing a drilling system 764, according to various embodiments of the present disclosure. The system 764 includes a drilling rig 702 located at the surface 704 of a well 706. The drilling rig 702 may provide support for a drillstring 708. The drillstring 708 may operate to penetrate the rotary table 710 for drilling the wellbore 712 through the subterranean formation 104. The drillstring 708 may include a drill pipe 718 and a bottom hole assembly (BHA) 720 (e.g., drill string), which may be located at the lower portion of the drill pipe 718.

The BHA 720 may include drill collars 722, a down hole tool 724 including the logging tool 210, and a drill bit 726. The drill bit 726 may operate to create the wellbore 712 by penetrating the surface 704 and the formation 104. The downhole tool 724 may comprise any of a number of different types of tools besides the logging tool 210, previously described. The logging tool 210 may be used in MWD/LWD operations within a wellbore 712 that has already been cased with casing and cement. Using the logging tool 210 during an MWD/LWD operation may provide data to the surface 704 (e.g., hardwired, telemetry) on already cased and cemented portions of the wellbore 712, even as other portions of the wellbore 712 are being drilled.

During drilling operations within the cased wellbore 712, the drillstring 708 (which may include the drill pipe 718 and the BHA 720) may be rotated by the rotary table 710. Although not shown, in addition to or alternatively, the BHA 720 may also be rotated by a motor (e.g., a mud motor) that is located below the surface 704. Drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and the formation 104.

During drilling operations within the cased wellbore 712, a mud pump 732 may pump drilling fluid (which may also be referred to as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the wellbore 712. The drilling fluid may then be returned to the mud pit 734, where such fluid is filtered, cleaned, or otherwise processed for reuse in the formation 104 (e.g., stimulation operations) or for resell for other industry use within and/or outside of the oil and gas industry. In some examples, the drilling fluid can be used to cool the drill bit 726, as well as to provide lubrication for the drill bit 726 during drilling operations. Additionally, the drilling fluid may be used to remove subsurface formation cuttings created by operating the drill bit 726.

A workstation 792 including a control system 796 may include various modules comprising a non-transitory medium (e.g., memory circuitry) readable for storing instructions for execution by a processor, and associated hardware circuitry, firmware, software, and combinations thereof configured to execute various embodiments described herein. For example, the control system may digitize gamma spectrum taken from the wellbore 712 using the logging tool 210, compute a correlation coefficient between the digitized wellbore gamma spectrum and one or more digitized standard gamma so as to establish one or more wellbore HPFs at a target depth or location, compare the wellbore HPF(s) to a digitized cement quality curve representing a volumetric void space of a completion profile matching that of the wellbore 712, and determining an output correlative to the volume of an unknown cement volumetric void space within an annulus of the wellbore 712.

As an example, the workstation 792 with control system 796 may be configured to digitize count rates of different gamma energy into multichannel spectra and generate formation 104-independent gamma energy spectra and use the spectra shape and amplitude to determine cement quality, according to the methods described previously. The control system 792 may be configured to store various cement quality curves of different completion profiles and instructions for determining wellbore HPF and quality curve HPF values, as well as to compare those values to determine cement quality (i.e., volumetric void space within a cement column). In some embodiments, the control system 796 may be configured to digitize the received one or more wellbore gamma spectrum and further determine a photon count rate, an amplitude, and a shape of the gamma spectra in order to determine the quality of the cement using the wellbore HPF and cement quality curves described herein.

Thus, in various examples, components of a system operable to conduct gamma energy photon digitization from the detector of the logging tool 210, as described herein or in a similar manner, which may be realized in combinations of hardware and/or processor executed software. These implementations can include a machine-readable storage device having machine-executable instructions, such as a computer-readable storage medium having computer-executable instructions. Further, a computer-readable storage medium may be a physical device that stores data represented by a physical structure within the device. Such a physical device is a non-transitory device. Examples of machine-readable storage devices may include, but are not limited to, read only memory (ROM), random access memory (RAM), a magnetic disk storage device, an optical storage device, a flash memory, other electronic, magnetic, and/or optical memory devices, and combinations thereof.

Figure 8:
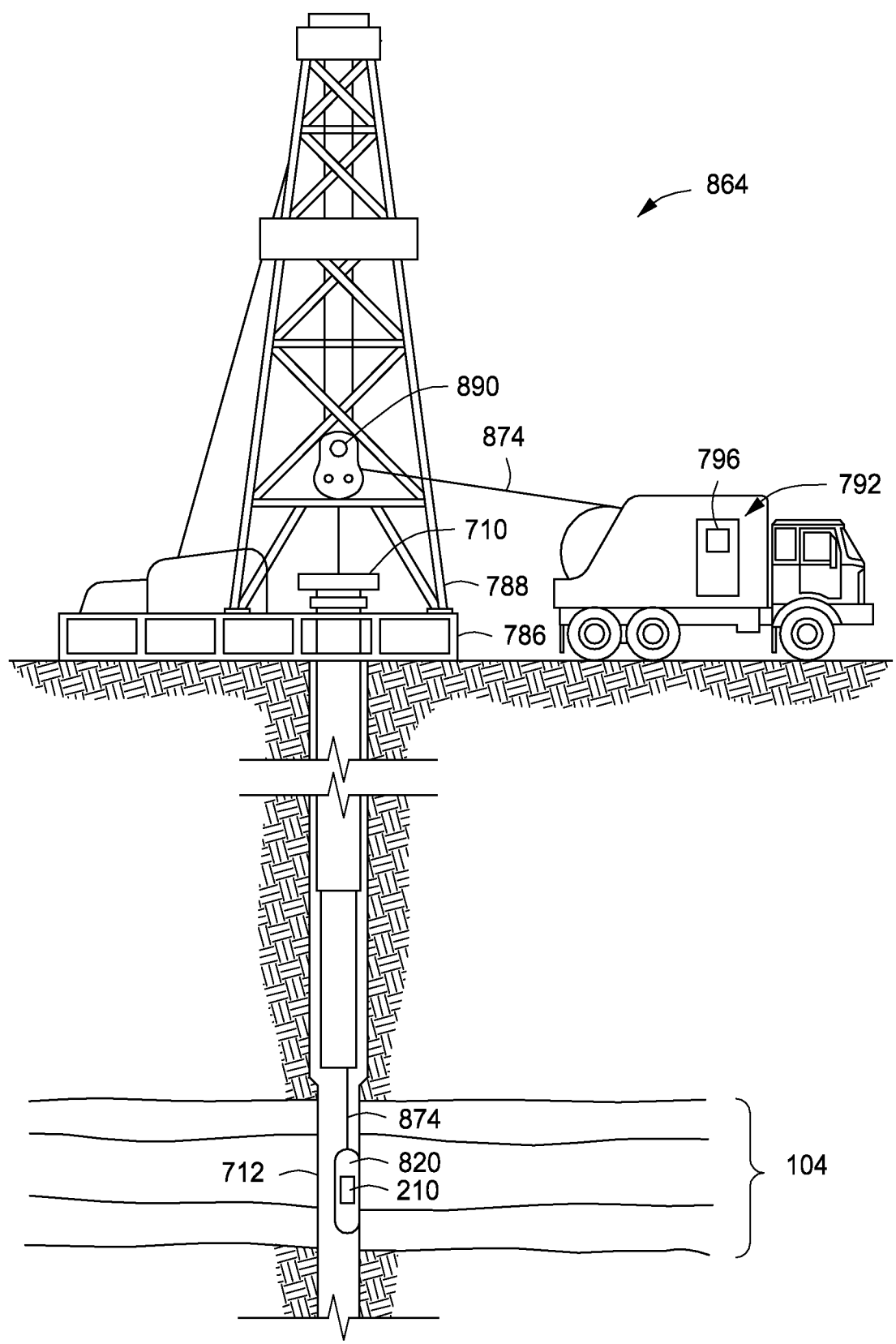
FIG. 8 is a diagram showing a wireline system, according to one or more embodiments of the present disclosure.

FIG. 8 is a diagram showing a wireline system 864, according to various examples of the disclosure. The system 864 may comprise a wireline logging tool body 820, as part of a wireline logging operation in a cased and cemented wellbore 712, which includes the logging tool 210 as described previously.

A drilling platform 786 equipped with a derrick 788 that supports a hoist 890 can be seen. Drilling oil and gas wells is commonly carried out using a string of drill pipes connected together so as to form a drillstring that is lowered through a rotary table 710 into the cased wellbore 712. As depicted, it is assumed that the drillstring has been temporarily removed from the wellbore 712 to allow the wireline logging tool body 820, such as a probe or sonde with the logging tool 210, to be lowered by wireline or logging cable 874 (e.g., a slickline cable) into the wellbore 712. Typically, the wireline logging tool body 820 is lowered to the a region of interest (e.g., at a particular depth within the wellbore 712 or a particular location along the length of the wellbore, and subsequently pulled upward at typically a substantially constant speed. In an embodiment, the logging tool 210 is immediately adjacent to the wall of the wellbore 712, as previously discussed.

During the upward trip, at a series of depths, various instruments may be used to perform quality measurements on the cement column within the wellbore 712, including measurements taken by the logging tool 210, as described herein. Other types of measurements or measuring devices may be included in the wireline logging tool body 820, such as for measuring temperature, formation pressure, formation fluids, porosity, permeability, and the like, which may be taken in tandem or at different times and/or locations than the logging tool 210. The wireline data may be communicated to a surface logging facility (e.g., workstation 792) for processing, analysis, and/or storage. The logging facility 792 may be provided with electronic equipment for various types of signal processing as described previously. The workstation 792 may have a controller 796 that is coupled to the logging tool 210 through the wireline 874 or other telemetry in order to receive data from the logging tool 210 regarding the detected gamma photons and generate the energy spectra for use in determining wellbore HPF for use in determining a volumetric void space of cement.

It should be noted that while FIGS. 7 and 8 generally depict land-based systems, it is to be recognized that like systems may be operated in subsea locations as well. Moreover, it will be appreciated that although a vertical wellbore 712 is depicted in FIGS. 7 and 8, vertical or deviated wellbores, or combinations thereof, may additionally be used in accordance with the embodiments of the present disclosure. Additionally, the logging facility 792 of FIG. 8 need not be located on a truck or be a mobile facility, as stationary facilities may also be used in accordance with the embodiments described herein.

Figure 9:
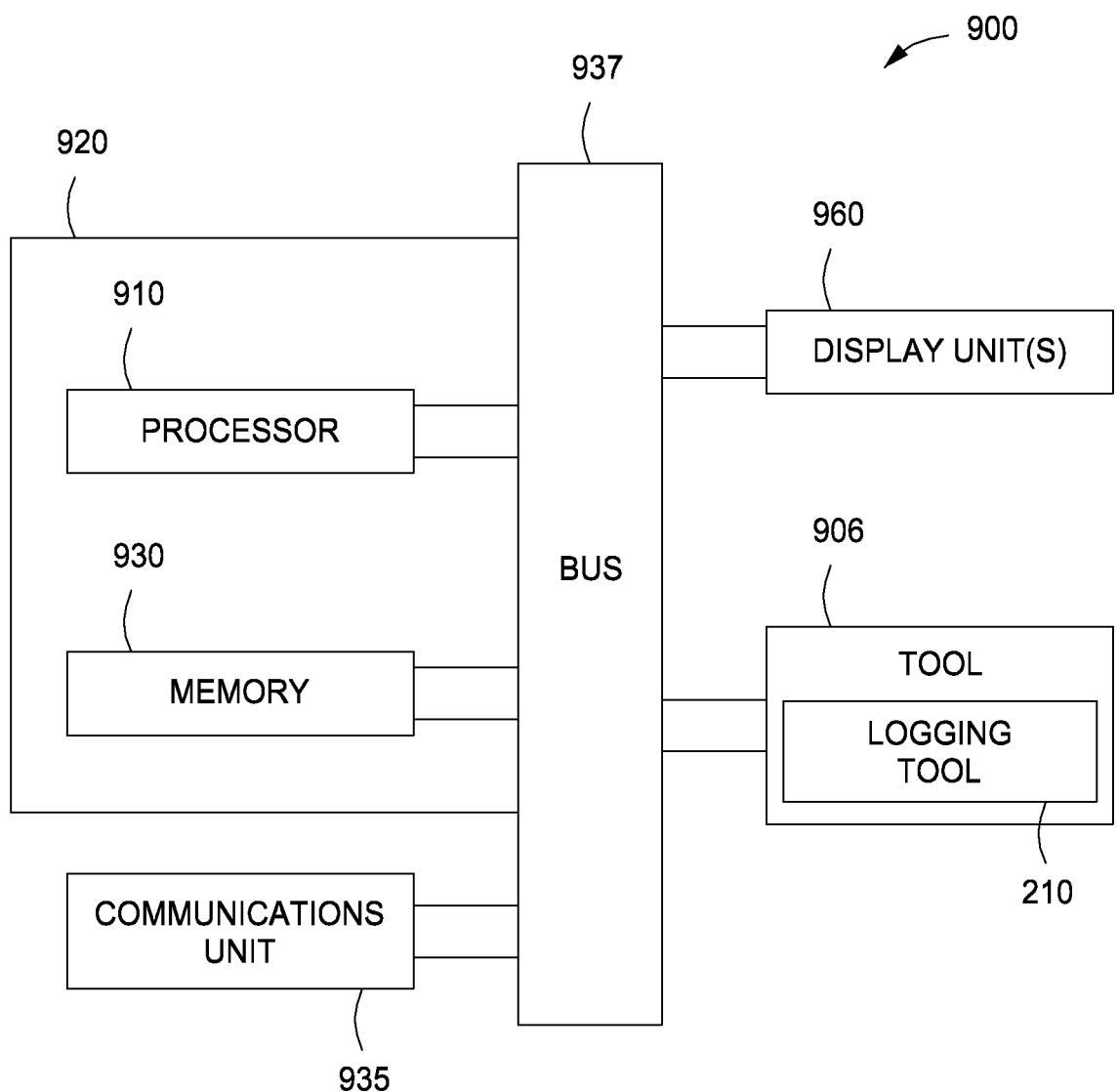
FIG. 9 is a block diagram of an example system operable to implement one or more embodiments of the present disclosure.

Referring now to FIG. 9, illustrated is a block diagram of an example system 900 operable to implement the activities of multiple methods, according to various embodiments of the present disclosure. The system 900 may include a tool housing 906 having the logging tool 210 such as that illustrated in FIG. 2. The system 900 may be configured to operate in accordance with the teachings herein to perform formation independent cement evaluation measurements in order to determine volumetric void space of cement in a cement column between a casing string and a formation. The system 900 of FIG. 9 may be implemented as shown in FIGS. 7 and 8, with reference to the workstation 792 and control system 796.

The system 900 may include a control system 920 comprising memory 930 and a processor 910. The memory 930 may be structured to include a database. The system 900 may further include a communications unit 935. The processor 910 may be configured to digitize detected gamma photon count rates to generate multichannel gamma energy spectra having an amplitude and shape over a defined energy range that is a result of the change in cement volumetric void space and, thus, independent of the formation properties.

The communications unit 935 may include downhole communications for appropriately locating sensors in a wellbore. Such downhole communications may include, for example, a telemetry system. Such a system may allow a target depth to be reached for obtaining desired wellbore gamma spectra with the logging tool 210, as described herein. The communications unit 935 may use combinations of wired communication technologies and wireless technologies at frequencies that do not interfere with on-going measurements.

The system 900 may also include a bus 937, where the bus 937 provides electrical conductivity among the components of the system 900 (e.g., between the control system 920 and the and the detector of the logging tool 210). The bus 937 may include an address bus, a data bus, and a control bus, each independently configured or in an integrated format. The bus 937 may be realized using a number of different communication mediums that allow for the distribution of components of the system 900. The bus 937 may include a network. Use of the bus 937 may be regulated by the control system 920. The system 900 may include one or more display unit(s) 960 as a distributed component on the surface of a wellbore, which may be used with instructions stored in the memory 930 to implement a user interface to monitor the operation of the logging tool 210 or other components distributed within the system 900. The user interface may be used to input parameter values for thresholds such that the system 900 can operate substantially autonomously without user intervention in a variety of applications. The user interface may also provide for manual override and change of control of the system 900 to a user. Such a user interface may be operated in conjunction with the communications unit 935 and the bus 937.

Embodiments disclosed herein include:

Embodiment A

A method comprising: establishing a wellbore heterogeneity profiling factor (HPF), wherein establishing the wellbore HPF comprises: taking a gamma spectrum from a wellbore having a completion profile, the wellbore gamma spectrum taken at a target depth, obtaining a gamma spectrum from a standard for the completion profile, and obtaining a wellbore HPF correlation coefficient between the wellbore gamma spectrum and the standard gamma spectrum at the target depth; establishing a cement quality curve representing a volumetric void space of the completion profile, comparing the wellbore HPF and the cement quality curve; and determining a cement volumetric void space in the wellbore at the target depth.

Embodiment A may have one or more of the following additional elements in any combination:

Element A1: Wherein a plurality of wellbore HPFs are established at a plurality of target depths, thereby determining the cement volumetric void space in the wellbore at the plurality of target depths.

Element A2: Wherein the standard is a free-pipe standard or a well-bonded standard.

Element A3: Wherein the standard is based on an actual reference wellbore, an electronically simulated wellbore, or a physically simulated wellbore.

Element A4: Wherein the standard is based on an electronically simulated wellbore using Monte Carlo simulation.

Element A5: Wherein the wellbore HPF is established using the wellbore gamma spectrum and the standard gamma spectrum within an identically defined processing energy range.

Element A6: Wherein the wellbore HPF is established using the wellbore gamma spectrum and the standard gamma spectrum within an identically defined processing energy range, and the identically defined processing energy range is of from about 250 keV to about 500 keV.

Element A7: Wherein the cement quality curve is based on an electronically simulated wellbore or a physically simulated wellbore.

Element A8: Wherein the wellbore gamma spectrum and the standard gamma spectrum is based on a detected photon count rate, an energy spectra shape, or an energy spectra amplitude.

Element A9: Wherein two standard gamma spectra are obtained: a free-pipe standard gamma spectrum and a well-bonded standard gamma spectrum are obtained, and the wellbore HPF correlation coefficient is determined by: (a) normalizing the wellbore gamma spectrum and the standard gamma spectra; (b) dividing the normalized wellbore gamma spectrum by the one of the normalized standard gamma spectra; and (c) calculating the wellbore HPF correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized wellbore gamma spectrum and y represents the other normalized standard gamma spectra.

Element A10: Wherein two standard gamma spectra are obtained: a free-pipe standard gamma spectrum and a well-bonded standard gamma spectrum are obtained, and the wellbore HPF correlation coefficient is determined by: (a) normalizing the wellbore gamma spectrum and the standard gamma spectra; (b) dividing the normalized wellbore gamma spectrum by the one of the normalized standard gamma spectra; and (c) calculating the wellbore HPF correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized wellbore gamma spectrum and y represents the other normalized standard gamma spectra; and wherein either: (1) the normalized standard gamma spectrum of step (b) is based on the free-pipe standard and the normalized standard gamma spectrum of step (c) is based on the well-bonded standard, or (2) the normalized standard spectrum of step (b) is based on the well-bonded standard and the normalized standard spectrum of step (c) is based on the free-pipe standard.

Element A11: Wherein the cement quality curve is determined by: (a) creating a plurality of simulated wellbores having the completion profile comprising an annulus, where (t) is the thickness of the annulus and (p %) is a void resolution thickness percentage; (b) establishing a cement-only thickness simulated wellbore, where (t) has 100% cement; (c) establishing a no-cement thickness simulated wellbore, where (t) has 0% cement; (d) establishing at least one cement-void thickness simulated wellbore according to the Formula: (t)*(n)(p %), wherein n represents an integer between 1 and 1/(p %)−1; (e) obtaining a gamma spectrum for the cement-only thickness simulated wellbore, the no-cement thickness simulated wellbore, and the at least one cement-void thickness simulated wellbore; and (f) obtaining a quality curve correlation coefficient between the at least one cement-void thickness gamma spectrum and the cement-only thickness gamma spectrum, or between the at least one cement-void thickness gamma spectrum and the no-cement thickness gamma spectrum, thereby obtaining a plurality of quality curve heterogeneity profiling factors (HPFs), wherein the quality curve represents the volumetric void space of the completion profile based on the at least one cement void thickness and the plurality of quality curve HPFs.

Element A12: Wherein the cement quality curve is determined by: (a) creating a plurality of simulated wellbores having the completion profile comprising an annulus, where (t) is the thickness of the annulus and (p %) is a void resolution thickness percentage; (b) establishing a cement-only thickness simulated wellbore, where (t) has 100% cement; (c) establishing a no-cement thickness simulated wellbore, where (t) has 0% cement; (d) establishing at least one cement-void thickness simulated wellbore according to the Formula: (t)*(n)(p %), wherein n represents an integer between 1 and 1/(p %)−1; (e) obtaining a gamma spectrum for the cement-only thickness simulated wellbore, the no-cement thickness simulated wellbore, and the at least one cement-void thickness simulated wellbore; and (f) obtaining a quality curve correlation coefficient between the at least one cement-void thickness gamma spectrum and the cement-only thickness gamma spectrum, or between the at least one cement-void thickness gamma spectrum and the no-cement thickness gamma spectrum, thereby obtaining a plurality of quality curve heterogeneity profiling factors (HPFs); and wherein the quality curve correlation coefficient is determined by: (1) normalizing the cement-only thickness gamma spectrum, the no-cement thickness gamma spectrum, and the at least one cement-void thickness gamma spectrum; (2) dividing the normalized at least one cement-void thickness gamma spectrum and the normalized no-cement thickness gamma spectrum by the normalized cement-only thickness gamma spectrum; and (3) calculating the quality curve correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized at least one cement-void thickness gamma spectrum and y represents the normalized no-cement thickness gamma spectrum.

Element A13: Wherein the cement quality curve is determined by: (a) creating a plurality of simulated wellbores having the completion profile comprising an annulus, where (t) is the thickness of the annulus and (p %) is a void resolution thickness percentage; (b) establishing a cement-only thickness simulated wellbore, where (t) has 100% cement; (c) establishing a no-cement thickness simulated wellbore, where (t) has 0% cement; (d) establishing at least one cement-void thickness simulated wellbore according to the Formula: (t)*(n)(p %), wherein n represents an integer between 1 and 1/(p %)−1; (e) obtaining a gamma spectrum for the cement-only thickness simulated wellbore, the no-cement thickness simulated wellbore, and the at least one cement-void thickness simulated wellbore; and (f) obtaining a quality curve correlation coefficient between the at least one cement-void thickness gamma spectrum and the cement-only thickness gamma spectrum, or between the at least one cement-void thickness gamma spectrum and the no-cement thickness gamma spectrum, thereby obtaining a plurality of quality curve heterogeneity profiling factors (HPFs); and wherein the quality curve correlation coefficient is determined by: (1) normalizing the cement-only thickness gamma spectrum, the no-cement thickness gamma spectrum, and the at least one cement-void thickness gamma spectrum; (2) dividing the normalized at least one cement-void thickness gamma spectrum and the normalized cement-only thickness gamma spectrum by the normalized no-cement thickness gamma spectrum; and (3) calculating the quality curve correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized at least one cement-void thickness gamma spectrum and y represents the normalized cement-only thickness gamma spectrum.

By way of non-limiting example, exemplary combinations applicable to A include: A1-A13; A1, A2, and A8; A4, A6, and A11; A10 and A13; A5, A7, A8, and A12; A2 and A12; A3, A5, and A13; A4, A8, and A9; and the like.

Embodiment B

A system comprising: a conveyance extending into a wellbore penetrating a subterranean formation, wherein the wellbore has a completion profile comprising a pipe and an annulus between the pipe and the subterranean formation, and an unknown volumetric void space of cement disposed in the annulus; a downhole logging tool coupled to the conveyance, the downhole logging tool comprising a gamma source and a detector for obtaining a gamma spectrum of the wellbore at a target depth; a control system coupled to the detector, the control system comprising a non-transitory medium readable for storing instructions for execution by a processor for performing a method, the method comprising: digitizing the gamma spectrum of the wellbore at the target depth; obtaining a wellbore heterogeneity profiling factor (HPF) correlation coefficient between the digitized wellbore gamma spectrum and a digitized standard gamma spectrum, thereby establishing a wellbore HPF at the target depth; comparing the wellbore HPF with a digitized cement quality curve representing a volumetric void space of the completion profile; and determining a volume of the unknown volumetric void space of cement disposed in the annulus at the target depth.

Embodiment B may have one or more of the following additional elements in any combination:

Element B1: Wherein the digitized standard is a free-pipe standard or a well-bonded standard.

Element B2: Wherein the digitized standard is based on an actual reference wellbore, an electronically simulated wellbore, or a physically simulated wellbore.

Element B3: Wherein the digitized standard is based on an electronically simulated wellbore using Monte Carlo simulation.

Element B4: Wherein the digitized wellbore gamma spectrum and the digitized standard gamma spectrum are within an identically defined processing energy range.

Element B5: Wherein the digitized wellbore gamma spectrum and the digitized standard gamma spectrum are within an identically defined processing energy range, and the identically defined processing energy range is of from about 250 keV to about 500 keV.

Element B6: Wherein the digitized cement quality curve is based on an electronically simulated wellbore or a physically simulated wellbore.

Element B7: Wherein a plurality of wellbore HPFs are established at a plurality of target depths, thereby determining the cement volumetric void space in the wellbore at the plurality of target depths.

Element B8: Wherein the digitized wellbore gamma spectrum and the digitized standard gamma spectrum is based on a detected photon count rate, an energy spectra shape, or an energy spectra amplitude.

By way of non-limiting example, exemplary combinations applicable to A and/or B include: B1-B8; B2, B3, and B8; B4 and B7; B1, B5, and B6; B7 and B8; B1, B3, B4, and B7; and the like.

It will further be appreciated that the methods for determining the correlation coefficient for determining the wellbore HPF(s) and the cement quality curve described with reference to the methods of the present disclosure are additionally applicable to the systems of the present disclosure, without departing from the scope described herein. That is, Elements A1-A13 are equally applicable to Embodiment B, and Elements B1-B8 are equally applicable to Embodiment A.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   establishing a wellbore heterogeneity profiling factor (HPF), wherein establishing the wellbore HPF comprises:
      taking a gamma spectrum from a wellbore having a completion profile, the wellbore gamma spectrum taken at a target depth,
      obtaining a gamma spectrum from a standard for the completion profile, and
      obtaining a wellbore HPF correlation coefficient between the wellbore gamma spectrum and the standard gamma spectrum at the target depth;
   establishing a cement quality curve representing a volumetric void space of the completion profile,
   comparing the wellbore HPF and the cement quality curve; and
   determining a cement volumetric void space in the wellbore at the target depth.

2. The method of claim 1, wherein a plurality of wellbore HPFs are established at a plurality of target depths, thereby determining the cement volumetric void space in the wellbore at the plurality of target depths.

3. The method of claim 1, wherein the standard is a free-pipe standard or a well-bonded standard.

4. The method of claim 1, wherein the standard is based on an actual reference wellbore, an electronically simulated wellbore, or a physically simulated wellbore.

5. The method of claim 1, wherein the standard is based on an electronically simulated wellbore using Monte Carlo simulation.

6. The method of claim 1, wherein the wellbore HPF is established using the wellbore gamma spectrum and the standard gamma spectrum within an identically defined processing energy range.

7. The method of claim 1, wherein the wellbore HPF is established using the wellbore gamma spectrum and the standard gamma spectrum within an identically defined processing energy range, and the identically defined processing energy range is of from about 250 keV to about 500 keV.

8. The method of claim 1, wherein the cement quality curve is based on an electronically simulated wellbore or a physically simulated wellbore.

9. The method of claim 1, wherein the wellbore gamma spectrum and the standard gamma spectrum is based on a detected photon count rate, an energy spectra shape, or an energy spectra amplitude.

10. The method of claim 1, wherein two standard gamma spectra are obtained: a free-pipe standard gamma spectrum and a well-bonded standard gamma spectrum are obtained, and the wellbore HPF correlation coefficient is determined by:
    (a) normalizing the wellbore gamma spectrum and the standard gamma spectra;
    (b) dividing the normalized wellbore gamma spectrum by the one of the normalized standard gamma spectra; and
    (c) calculating the wellbore HPF correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized wellbore gamma spectrum and y represents the other normalized standard gamma spectra.

11. The method of claim 10, wherein either:
    (1) the normalized standard gamma spectrum of step (b) is based on the free-pipe standard and the normalized standard gamma spectrum of step (c) is based on the well-bonded standard, or
    (2) the normalized standard spectrum of step (b) is based on the well-bonded standard and the normalized standard spectrum of step (c) is based on the free-pipe standard.

12. The method of claim 1, wherein the cement quality curve is determined by:
    (a) creating a plurality of simulated wellbores having the completion profile comprising an annulus, where (t) is the thickness of the annulus and (p %) is a void resolution thickness percentage;
    (b) establishing a cement-only thickness simulated wellbore, where (t) has 100% cement;
    (c) establishing a no-cement thickness simulated wellbore, where (t) has 0% cement;
    (d) establishing at least one cement-void thickness simulated wellbore according to the Formula: (t)*(n)(p %), wherein n represents an integer between 1 and 1/(p %)−1;
    (e) obtaining a gamma spectrum for the cement-only thickness simulated wellbore, the no-cement thickness simulated wellbore, and the at least one cement-void thickness simulated wellbore; and
    (f) obtaining a quality curve correlation coefficient between the at least one cement-void thickness gamma spectrum and the cement-only thickness gamma spectrum, or between the at least one cement-void thickness gamma spectrum and the no-cement thickness gamma spectrum, thereby obtaining a plurality of quality curve heterogeneity profiling factors (HPFs), wherein the quality curve represents the volumetric void space of the completion profile based on the at least one cement void thickness and the plurality of quality curve HPFs.

13. The method of claim 12, wherein the quality curve correlation coefficient is determined by:
(a) normalizing the cement-only thickness gamma spectrum, the no-cement thickness gamma spectrum, and the at least one cement-void thickness gamma spectrum;
(b) dividing the normalized at least one cement-void thickness gamma spectrum and the normalized no-cement thickness gamma spectrum by the normalized cement-only thickness gamma spectrum; and
(c) calculating the quality curve correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized at least one cement-void thickness gamma spectrum and y represents the normalized no-cement thickness gamma spectrum.

14. The method of claim 12, wherein the quality curve correlation coefficient is determined by:
(a) normalizing the cement-only thickness gamma spectrum, the no-cement thickness gamma spectrum, and the at least one cement-void thickness gamma spectrum;
(b) dividing the normalized at least one cement-void thickness gamma spectrum and the normalized cement-only thickness gamma spectrum by the normalized no-cement thickness gamma spectrum; and
(c) calculating the quality curve correlation coefficient according to the $$\text{Formula } \frac{\sum (x-\bar{x})(y-\bar{y})}{\sqrt{\sum (x-\bar{x})^2 \sum (y-\bar{y})^2}},$$

where x represents the normalized at least one cement-void thickness gamma spectrum and y represents the normalized cement-only thickness gamma spectrum.

15. A system comprising:
a conveyance extending into a wellbore penetrating a subterranean formation, wherein the wellbore has a completion profile comprising a pipe and an annulus between the pipe and the subterranean formation, and an unknown volumetric void space of cement disposed in the annulus;
a downhole logging tool coupled to the conveyance, the downhole logging tool comprising a gamma source and a detector for obtaining a gamma spectrum of the wellbore at a target depth;
a control system coupled to the detector, the control system comprising a non-transitory medium readable for storing instructions for execution by a processor for performing a method, the method comprising:
digitizing the gamma spectrum of the wellbore at the target depth;
obtaining a wellbore heterogeneity profiling factor (HPF) correlation coefficient between the digitized wellbore gamma spectrum and a digitized standard gamma spectrum, thereby establishing a wellbore HPF at the target depth;
comparing the wellbore HPF with a digitized cement quality curve representing a volumetric void space of the completion profile; and
determining a volume of the unknown volumetric void space of cement disposed in the annulus at the target depth.

16. The system of claim 15, wherein the digitized standard is a free-pipe standard or a well-bonded standard.

17. The system of claim 15, wherein the digitized standard is based on an actual reference wellbore, an electronically simulated wellbore, or a physically simulated wellbore.

18. The system of claim 15, wherein the digitized standard is based on an electronically simulated wellbore using Monte Carlo simulation.

19. The system of claim 15, wherein the digitized wellbore gamma spectrum and the digitized standard gamma spectrum are within an identically defined processing energy range.

20. The system of claim 15, wherein the digitized cement quality curve is based on an electronically simulated wellbore or a physically simulated wellbore.

* * * * *